(12) United States Patent
Li et al.

(10) Patent No.: US 10,831,315 B2
(45) Date of Patent: Nov. 10, 2020

(54) TOUCH CONTROL METHOD AND SYSTEM, MOBILE TERMINAL, AND STORAGE MEDIUM

(71) Applicant: ONEPLUS TECHNOLOGY (SHENZHEN) CO., LTD., Shenzhen (CN)

(72) Inventors: Feng Li, Shenzhen (CN); Zhonglan Sun, Shenzhen (CN); Xuan Zhang, Shenzhen (CN)

(73) Assignee: ONEPLUS TECHNOLOGY (SHENZHEN) CO., LTD., Shenzhen (CN)

(*) Notice: Subject to any disclaimer, the term of this patent is extended or adjusted under 35 U.S.C. 154(b) by 0 days.

(21) Appl. No.: 16/467,213

(22) PCT Filed: Dec. 6, 2017

(86) PCT No.: PCT/CN2017/114783
§ 371 (c)(1),
(2) Date: Jun. 6, 2019

(87) PCT Pub. No.: WO2018/103657
PCT Pub. Date: Jun. 14, 2018

(65) Prior Publication Data
US 2020/0081575 A1    Mar. 12, 2020

(30) Foreign Application Priority Data

Dec. 8, 2016  (CN) .......................... 2016 1 1124179

(51) Int. Cl.
*G06F 3/041*  (2006.01)
*G06F 3/044*  (2006.01)
*G06K 9/00*   (2006.01)

(52) U.S. Cl.
CPC ............ *G06F 3/0418* (2013.01); *G06F 3/044* (2013.01); *G06K 9/0002* (2013.01)

(58) Field of Classification Search
CPC ..................... G06F 3/0418; G06F 3/044–0448
See application file for complete search history.

(56) References Cited

U.S. PATENT DOCUMENTS 9,507,454 B1    11/2016  Koblyuk
2013/0265258 A1 10/2013  Garfinkel et al.
(Continued)

FOREIGN PATENT DOCUMENTS

CN    103258171 A    8/2013
CN    104375761 A    2/2015
(Continued)

OTHER PUBLICATIONS

International Search Report in the international application No. PCT/CN2017/114783, dated Mar. 6, 2018.
(Continued)

*Primary Examiner* — Hang Lin
(74) *Attorney, Agent, or Firm* — Syncoda LLC; Feng Ma

(57) ABSTRACT

A touch control method, a system, a mobile terminal and a storage medium can have operations of receiving a touch control operation from a touch fingerprint sensor; detecting valid touch information on a touch screen; comparing the valid touch information with a pre-set touch information threshold value, and when the valid touch information is less than or equal to the pre-set touch information threshold value, responding with a pre-set operation to the touch control operation on the touch fingerprint sensor, when the valid touch information is greater than the pre-set touch information threshold value, ending a response of the touch fingerprint sensor to the touch control operation.

9 Claims, 12 Drawing Sheets

(56) References Cited

U.S. PATENT DOCUMENTS

| | | | |
|---|---|---|---|
| 2014/0253488 A1 | 9/2014 | Vukovic | |
| 2015/0130742 A1* | 5/2015 | Chen | G06F 3/0416 |
| | | | 345/174 |
| 2015/0363632 A1* | 12/2015 | Ahn | G06F 3/04883 |
| | | | 382/124 |
| 2017/0205958 A1* | 7/2017 | Kurasawa | G06F 3/0445 |
| 2017/0351896 A1 | 12/2017 | Jiang et al. | |

FOREIGN PATENT DOCUMENTS

| | | |
|---|---|---|
| CN | 105388992 A | 3/2016 |
| CN | 105653915 A | 6/2016 |
| CN | 106022072 A | 10/2016 |
| CN | 106155393 A | 11/2016 |
| CN | 106775150 A | 5/2017 |
| EP | 3086260 A1 | 10/2016 |
| EP | 3252638 A1 | 12/2017 |

OTHER PUBLICATIONS

English translation of the Written Opinion of the International Search Authority in the international application No. PCT/CN2017/114783, dated Mar. 6, 2018.
Supplementary European Search Report in the European application No. 17877451.9, dated Dec. 5, 2019.

* cited by examiner

| 985 | 960 | 962 | 956 | 981 | 952 | 949 | 946 | 937 | 965 | 921 | 930 | 923 | 971 | 905 | 904 | 894 | 891 | 891 | 893 | 896 | 891 | 888 | 901 | 891 | 897 | 904 | 921 |
|---|---|---|---|---|---|---|---|---|---|---|---|---|---|---|---|---|---|---|---|---|---|---|---|---|---|---|---|
| 941 | 896 | 915 | 963 | 987 | 976 | 971 | 956 | 957 | 962 | 941 | 949 | 948 | 941 | 935 | 923 | 908 | 904 | 904 | 902 | 905 | 899 | 893 | 905 | 893 | 894 | 893 | 890 |
| 899 | 839 | 846 | 921 | 978 | 984 | 965 | 960 | 960 | 960 | 937 | 946 | 935 | 945 | 918 | 910 | 904 | 897 | 899 | 899 | 899 | 896 | 890 | 902 | 890 | 890 | 888 | 875 |
| 946 | 904 | 905 | 954 | 978 | 968 | 981 | 951 | 951 | 956 | 935 | 943 | 935 | 934 | 915 | 908 | 901 | 896 | 897 | 896 | 896 | 893 | 888 | 901 | 886 | 886 | 885 | 869 |
| 968 | 970 | 990 | 985 | 979 | 978 | 963 | 949 | 949 | 954 | 930 | 940 | 932 | 930 | 913 | 907 | 897 | 894 | 894 | 893 | 894 | 890 | 885 | 896 | 883 | 883 | 882 | 860 |
| 973 | 971 | 978 | 971 | 979 | 967 | 962 | 948 | 948 | 951 | 929 | 937 | 927 | 941 | 910 | 902 | 893 | 890 | 890 | 890 | 898 | 885 | 880 | 891 | 879 | 880 | 877 | 853 |
| 974 | 973 | 978 | 971 | 978 | 965 | 962 | 946 | 945 | 949 | 926 | 949 | 924 | 924 | 905 | 899 | 891 | 885 | 886 | 886 | 885 | 882 | 875 | 888 | 875 | 875 | 874 | 847 |
| 976 | 974 | 978 | 971 | 978 | 965 | 960 | 945 | 943 | 946 | 940 | 932 | 923 | 921 | 902 | 896 | 888 | 882 | 883 | 883 | 882 | 879 | 874 | 885 | 872 | 872 | 869 | 842 |
| 979 | 1018 | 981 | 971 | 979 | 965 | 960 | 943 | 945 | 948 | 924 | 932 | 937 | 919 | 902 | 894 | 886 | 882 | 883 | 882 | 880 | 877 | 872 | 883 | 869 | 871 | 869 | 839 |
| 985 | 978 | 984 | 976 | 982 | 968 | 963 | 948 | 962 | 951 | 927 | 935 | 924 | 921 | 904 | 896 | 886 | 883 | 883 | 882 | 880 | 877 | 872 | 883 | 871 | 871 | 869 | 839 |
| 992 | 974 | 981 | 978 | 985 | 973 | 968 | 968 | 951 | 954 | 932 | 938 | 929 | 926 | 905 | 899 | 890 | 885 | 883 | 883 | 883 | 879 | 874 | 885 | 872 | 872 | 872 | 841 |
| 993 | 934 | 921 | 963 | 987 | 992 | 970 | 954 | 952 | 956 | 932 | 941 | 930 | 929 | 910 | 902 | 893 | 888 | 890 | 888 | 888 | 883 | 879 | 890 | 877 | 877 | 875 | 844 |
| 990 | 875 | 853 | 918 | 982 | 973 | 967 | 952 | 951 | 968 | 930 | 938 | 929 | 926 | 907 | 899 | 891 | 888 | 888 | 886 | 888 | 885 | 879 | 891 | 877 | 879 | 875 | 842 |
| 996 | 954 | 908 | 963 | 979 | 967 | 962 | 946 | 946 | 948 | 924 | 932 | 921 | 918 | 899 | 891 | 885 | 880 | 882 | 882 | 882 | 879 | 874 | 886 | 872 | 874 | 868 | 831 |
| 998 | 1032 | 974 | 981 | 979 | 965 | 960 | 945 | 943 | 945 | 923 | 929 | 918 | 913 | 894 | 888 | 880 | 877 | 880 | 879 | 879 | 875 | 871 | 885 | 871 | 869 | 864 | 822 |
| 1009 | 990 | 971 | 959 | 956 | 941 | 935 | 919 | 916 | 921 | 897 | 905 | 893 | 888 | 869 | 863 | 857 | 853 | 857 | 855 | 855 | 852 | 846 | 858 | 844 | 842 | 838 | 792 |

FIG. 5

| 995 | 970 | 971 | 962 | 982 | 954 | 951 | 948 | 937 | 965 | 921 | 930 | 924 | 973 | 905 | 904 | 896 | 891 | 893 | 893 | 894 | 890 | 886 | 899 | 888 | 894 | 902 | 921 |
|---|---|---|---|---|---|---|---|---|---|---|---|---|---|---|---|---|---|---|---|---|---|---|---|---|---|---|---|
| 1001 | 993 | 996 | 987 | 982 | 978 | 974 | 959 | 959 | 963 | 941 | 949 | 941 | 941 | 937 | 923 | 907 | 904 | 904 | 902 | 902 | 899 | 891 | 904 | 890 | 891 | 891 | 888 |
| 996 | 981 | 985 | 979 | 984 | 987 | 967 | 962 | 960 | 960 | 937 | 945 | 937 | 943 | 916 | 910 | 902 | 899 | 899 | 897 | 897 | 894 | 888 | 899 | 885 | 885 | 886 | 875 |
| 978 | 979 | 985 | 978 | 982 | 970 | 982 | 952 | 951 | 956 | 935 | 943 | 935 | 932 | 913 | 908 | 901 | 896 | 897 | 894 | 894 | 891 | 886 | 897 | 882 | 883 | 882 | 866 |
| 974 | 979 | 1000 | 990 | 982 | 979 | 965 | 951 | 949 | 954 | 930 | 940 | 932 | 929 | 912 | 905 | 896 | 893 | 893 | 890 | 891 | 888 | 882 | 893 | 880 | 880 | 879 | 858 |
| 978 | 976 | 982 | 974 | 981 | 968 | 963 | 948 | 948 | 951 | 927 | 935 | 926 | 941 | 908 | 901 | 893 | 888 | 888 | 886 | 888 | 883 | 877 | 888 | 875 | 877 | 875 | 852 |
| 979 | 978 | 982 | 973 | 981 | 967 | 963 | 948 | 946 | 949 | 926 | 949 | 924 | 923 | 905 | 897 | 890 | 885 | 885 | 883 | 883 | 880 | 875 | 886 | 874 | 874 | 871 | 846 |
| 981 | 978 | 981 | 973 | 979 | 965 | 960 | 946 | 943 | 946 | 940 | 932 | 923 | 921 | 902 | 894 | 886 | 882 | 882 | 880 | 880 | 875 | 872 | 882 | 869 | 871 | 868 | 841 |
| 984 | 1020 | 982 | 976 | 981 | 967 | 962 | 945 | 945 | 948 | 926 | 932 | 938 | 919 | 902 | 894 | 886 | 882 | 882 | 880 | 880 | 875 | 871 | 880 | 868 | 869 | 868 | 839 |
| 989 | 981 | 985 | 979 | 985 | 971 | 965 | 949 | 963 | 949 | 929 | 935 | 924 | 921 | 902 | 896 | 888 | 882 | 882 | 880 | 880 | 875 | 871 | 880 | 869 | 869 | 868 | 838 |
| 998 | 985 | 992 | 984 | 990 | 976 | 968 | 968 | 951 | 954 | 932 | 938 | 929 | 924 | 905 | 899 | 890 | 885 | 885 | 882 | 882 | 879 | 872 | 883 | 869 | 871 | 869 | 839 |
| 1006 | 989 | 995 | 987 | 993 | 995 | 973 | 956 | 954 | 956 | 934 | 941 | 930 | 927 | 908 | 902 | 893 | 888 | 888 | 886 | 886 | 882 | 877 | 888 | 874 | 875 | 874 | 844 |
| 1004 | 984 | 990 | 984 | 989 | 974 | 968 | 952 | 951 | 968 | 930 | 937 | 927 | 924 | 907 | 899 | 891 | 886 | 888 | 886 | 886 | 883 | 879 | 890 | 875 | 875 | 872 | 841 |
| 1001 | 990 | 985 | 995 | 984 | 970 | 963 | 948 | 946 | 948 | 924 | 930 | 921 | 918 | 897 | 891 | 883 | 880 | 880 | 880 | 880 | 877 | 874 | 885 | 871 | 871 | 866 | 828 |
| 1004 | 1040 | 984 | 987 | 982 | 968 | 960 | 945 | 943 | 945 | 923 | 929 | 916 | 913 | 894 | 886 | 880 | 877 | 879 | 877 | 877 | 874 | 871 | 880 | 868 | 866 | 863 | 820 |
| 1012 | 990 | 970 | 960 | 957 | 943 | 937 | 919 | 918 | 921 | 899 | 905 | 893 | 888 | 869 | 863 | 857 | 853 | 855 | 853 | 853 | 850 | 846 | 855 | 841 | 841 | 836 | 791 |

TOUCH CONTROL METHOD AND SYSTEM, MOBILE TERMINAL, AND STORAGE MEDIUM

CROSS-REFERENCE TO RELATED APPLICATIONS

The present application is filed upon and claims benefit of Chinese Patent Application No. 201611124179.7, filed on Dec. 8, 2016, the contents of which are hereby incorporated by reference in its entirety.

TECHNICAL FIELD

The disclosure relates to electrical digital data processing technologies, and particularly to a touch control method and system, a mobile terminal and a storage medium.

BACKGROUND

Along with rapid development of sciences and technologies and rapid emergence of fast payment such as Apple pay, a user may do some shopping simply and fast only by fingerprint identification. A mobile terminal (for example, a mobile phone) supporting such fingerprint-identification-based fast payment is usually configured with a touch fingerprint sensor for fingerprint identification.

However, the touch fingerprint sensor is likely to be accidentally triggered under the condition that the mobile terminal is placed in a pocket or close to a body, thereby resulting in problems such as frequent vibration notification generated by the mobile terminal or a screen locking caused by an excessive number of times of unlocking, and further bringing influence on battery life and user experience of the mobile terminal.

SUMMARY

For overcoming the shortcoming in a related art, embodiments of the disclosure are intended to provide a touch control method and system, a mobile terminal and a storage medium, which may reduce a probability that a touch fingerprint sensor is triggered and reduce the number of frequent vibration notifications or screen locking problem caused by triggering of the touch fingerprint sensor.

The embodiments of the disclosure provide a touch control method, which may be applied to a mobile terminal, the mobile terminal including a touch screen and a touch fingerprint sensor and the touch control method including the following operations.

A touch control operation on the touch fingerprint sensor is received.

Effective touch information on the touch screen is detected.

A value of the effective touch information is compared with a preset touch information threshold value, when the value of the effective touch information is less than or equal to the preset touch information threshold value, the touch control operation on the touch fingerprint sensor is responded to with a preset operation, and when the value of the effective touch information is larger than the preset touch information threshold value, a response by the touch fingerprint sensor to the touch control operation is terminated.

The embodiments of the disclosure also provide a touch control system, which may be applied to a mobile terminal, the mobile terminal including a touch screen and a touch fingerprint sensor, and the touch control system including a receiving module, a detection module and an execution module.

The receiving module is configured to receive a touch control operation on the touch fingerprint sensor.

The detection module is configured to detect effective touch information on the touch screen.

The execution module is configured to compare a value of the effective touch information and a preset touch information threshold value, when the value of the effective touch information is less than or equal to the preset touch information threshold value, respond with a preset operation to the touch control operation on the touch fingerprint sensor, and when the value of the effective touch information is larger than the preset touch information threshold value, terminate a response by the touch fingerprint sensor to the touch control operation.

The embodiments of the disclosure also provide a mobile terminal, which may include a touch screen; a touch fingerprint sensor; a memory, configured to store an executable instruction; and a processor, configured to execute the executable instruction stored in the memory to implement the touch control method provided in the embodiments of the disclosure.

The embodiments of the disclosure also provide a storage medium having stored thereon executable instructions that, when executed by a processor, cause the processor to implement the touch control method provided in the embodiments of the disclosure.

Compared with the related art, the embodiments of the disclosure have the following beneficial effects: the effective touch information on the touch screen is acquired, a value of the effective touch information is compared with the preset touch information threshold value, and a corresponding preset operation is further executed according to a comparison result, thereby overcoming the problem in the related art that the touch fingerprint sensor is likely to be accidentally triggered, preventing frequent vibration notification caused by the accidental triggering problem or a screen locking caused by an excessive number of times of unlocking and ensuring better battery life and user experience of the mobile terminal.

In order to make the purpose, characteristics and advantages of the disclosure clearer and easier to understand, detailed descriptions will be made below with the embodiments of the disclosure in combination with the drawings.

BRIEF DESCRIPTION OF THE DRAWINGS

In order to describe the technical solutions of the embodiments of the disclosure more clearly, the drawings required to be used in the embodiments will be simply introduced below. It is to be understood that the following drawings only illustrate some embodiments of the disclosure and thus should not be considered as limits to the scope. Other related drawings may further be obtained by those of ordinary skill in the art according to these drawings without creative work.

FIG. 5 is a schematic diagram of obtained sampled capacitance values of respective matrix dots on a touch screen according to an embodiment of the disclosure.

FIG. 6 is a schematic diagram of obtained reference capacitance values of respective matrix dots on a touch screen according to an embodiment of the disclosure.

FIG. 7 is a schematic diagram of capacitance difference values, obtained based on capacitance values of respective matrix dots in FIG. 5 and FIG. 6, of each matrix dot on a touch screen.

Figure 1:
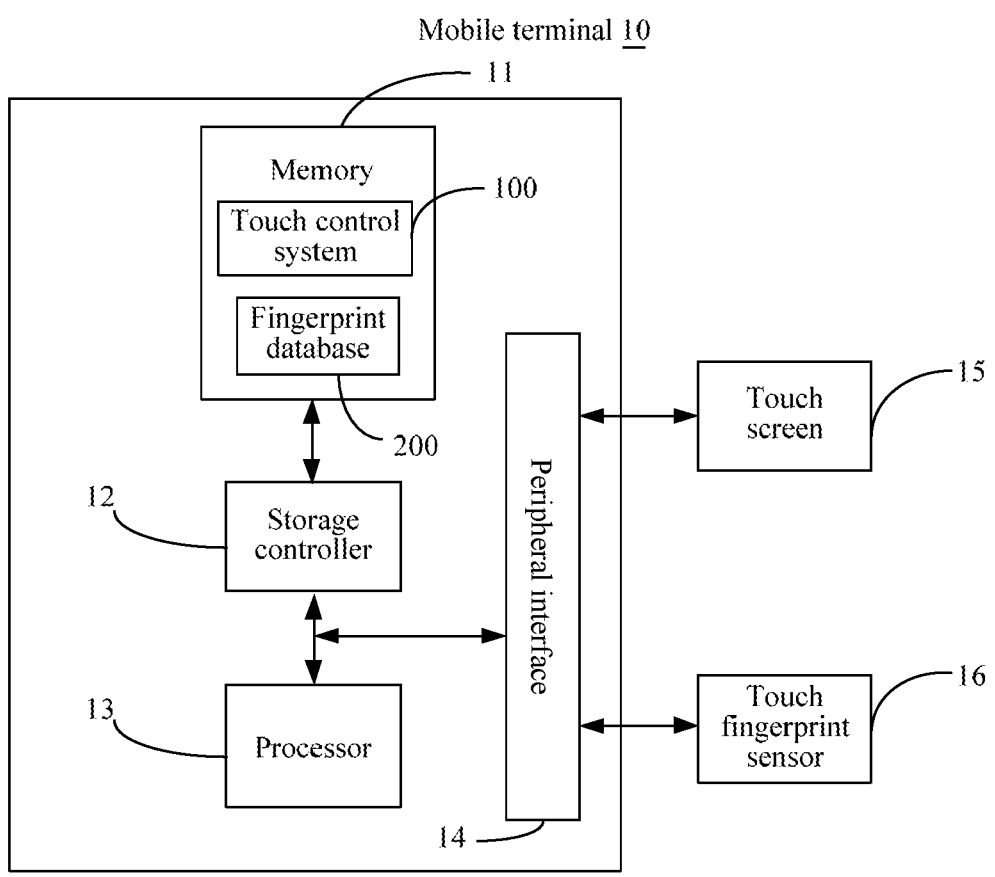
FIG. 1 is a block diagram of a mobile terminal according to an embodiment of the disclosure.

Reference signs: 10—mobile terminal; 100—touch control system; 11—memory; 12—storage controller; 13—processor; 14—peripheral interface; 15—touch screen; 16—touch fingerprint sensor; 200—fingerprint database; 110—receiving module; 120—detection module; 121—capacitance difference value acquisition submodule; 122—touch information acquisition submodule; 130—execution module; and 140—acquisition module.

DETAILED DESCRIPTION

In order to make the purpose, technical solutions and advantages of the embodiments of the disclosure clearer, the technical solutions in the embodiments of the disclosure will be clearly and completely described below in combination with the drawings in the embodiments of the disclosure. It is apparent that the described embodiments are not all embodiments but part of embodiments of the disclosure. Components, described and shown in the drawings, of the embodiments of the disclosure may usually be arranged and designed with various configurations.

Therefore, the following detailed descriptions about the embodiments of the disclosure in the drawings are not intended to limit the claimed scope of the disclosure but only represent selected embodiments of the disclosure. All other embodiments obtained by those of ordinary skill in the art based on the embodiments in the disclosure without creative work shall fall within the scope of protection of the disclosure.

It is to be noted that similar reference signs and letters represent similar terms in the following drawings and thus a certain term, once being defined in a drawing, is not required to be further defined and explained in subsequent drawings.

Some implementation modes of the disclosure will be described below in combination with the drawings in detail. The following embodiments and characteristics in the embodiments may be combined without conflicts.

FIG. 1 is a block diagram of a mobile terminal 10 according to an embodiment of the disclosure. The mobile terminal 10 may include a touch control system 100 including a series of executable instructions, a memory 11, a storage controller 12, a processor 13, a peripheral interface 14, a touch screen 15 and a touch fingerprint sensor 16. In the embodiment of the disclosure, the mobile terminal 10 may be, but not limited to, a smart phone, a Personal Computer (PC), a tablet computer, a Personal Digital Assistant (PDA), a Mobile Internet Device (MID) and the like. Optionally, the mobile terminal 10 is a smart phone.

Each component of the memory 11, the storage controller 12, the processor 13, the peripheral interface 14, the touch screen 15 and the touch fingerprint sensor 16 is electrically connected directly or indirectly to implement data transmission or interaction. For example, these components may be electrically connected through one or more communication buses or signal lines. The touch control system 100 includes at least one software function module which may be stored in the memory 11 in form of software or firmware or solidified in an Operating System (OS) of the mobile terminal 10. The memory 11 is further configured to store a fingerprint database 200, and the fingerprint database 200 includes fingerprint information preset by a user with an operation right over the mobile terminal 10, and is configured for fingerprint identification. The processor 13 is configured to execute an executable module stored in the memory 11, for example, the software function module and computer program in the touch control system 100.

Herein, the memory 11 may be, but not limited to, a Random Access Memory (RAM), a Read-Only Memory (ROM), a Programmable Read-Only Memory (PROM), an Erasable Programmable Read-Only Memory (EPROM), an Electrically Erasable Programmable Read-Only Memory (EEPROM) and the like. Herein, the memory 11 is configured to store a program, and the processor 13, after receiving the executable instruction, execute the program. The processor 13 and another possible component may access the memory 11 under control of the storage controller 12.

The processor 13 may be an integrated circuit chip with a signal processing capability. The processor 13 may be a universal processor, including a Central Processing Unit (CPU), a Network Processor (NP) and the like, and may also be a Digital Signal Processor (DSP), an Application Specific Integrated Circuit (ASIC), a Field-Programmable Gate Array (FPGA) or another programmable logic device, a discrete gate or transistor logic device and a discrete hardware component. Each method, step and logical block diagram disclosed in the embodiments of the disclosure may be implemented or executed. The universal processor may be a microprocessor or the processor may also be any conventional processor and the like. The peripheral interface 14 couples each input/output device to the processor 13 and the memory 11. In some embodiments, the peripheral interface 14, the processor 13 and the storage controller 12 may be implemented in a single chip. In some other examples, they may be implemented by independent chips respectively.

The touch screen 15 may be a touch display, and may be a capacitive touch screen, resistive touch screen or the like supporting single-point and multi-point touch control operations. Supporting the single-point and multi-point touch control operations refers to that the touch display may sense touch operations at one or more positions on the touch display and perform, through the processor, calculation and processing on the sensed touch control operations. In the implementation mode of the disclosure, the touch screen 15 is a capacitive touch screen supporting the single-point and multi-point touch control operations.

The touch fingerprint sensor 16 is configured to receive a touch control operation of the user to implement data interaction between the user and the mobile terminal 10. In addition, the touch fingerprint sensor 16 is further configured to acquire the fingerprint information of the user for fingerprint identification.

It can be understood that the structure shown in FIG. 1 is only a structure diagram of the mobile terminal 10 and the mobile terminal 10 may further include components more or fewer than those shown in FIG. 1 or adopt a configuration different from that shown in FIG. 1. Each component shown in FIG. 1 may be implemented by use of hardware, software or a combination thereof.

Figure 2:
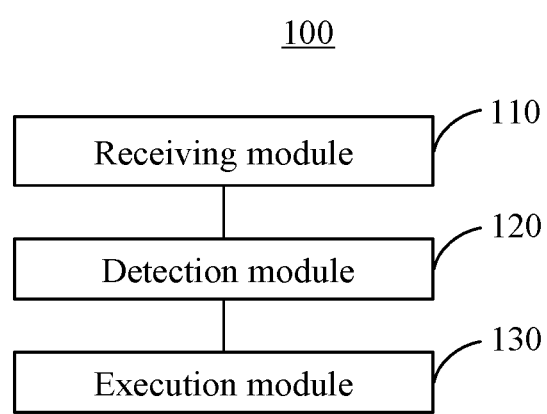
FIG. 2 is a block diagram of a touch control system shown in FIG. 1 according to an embodiment of the disclosure.

FIG. 2 is a block diagram of the touch control system 100 shown in FIG. 1 according to an embodiment of the disclosure. The touch control system 100 may include a receiving module 110, a detection module 120 and an execution module 130.

The receiving module 110 is configured to receive a touch control operation on the touch fingerprint sensor 16.

In the embodiment of the disclosure, the receiving module 110 may detect state information about whether the touch control operation is executed on the touch fingerprint sensor 16 or not. The receiving module 110 may determine whether the touch control operation is executed on the touch fingerprint sensor 16 or not through a change in an electrical signal (for example, voltage and capacitance values) of the touch fingerprint sensor 16 when the touch control operation is executed and the touch control operation is not executed and receive the touch control operation when the touch control operation is executed on the touch fingerprint sensor 16.

The detection module 120 is configured to detect effective touch information on the touch screen 15.

In the embodiment of the disclosure, a manner in which the detection module 120 detects the effective touch information on the touch screen 15 includes the following operations.

A sampling operation is performed on each matrix dot on the touch screen 15 to obtain sampled capacitance values of respective matrix dots.

The sampled capacitance values of respective matrix dots are processed based on reference capacitance values of respective matrix dots to obtain the effective touch information on the touch screen 15.

In the embodiment of the disclosure, the effective touch information is obtained according to relative magnitude relationships between the reference capacitance values and sampled capacitance values corresponding to each matrix dot on the touch screen 15. In the embodiment of the disclosure, the effective touch information may be, but not limited to, a number of the matrix dots effectively touched by the user on the touch screen 15, or a total area on the touch screen 15 and occupied by regions where the effectively touched matrix dots are located. Herein, the effectively touched matrix dot is a matrix dot of which a reference capacitance value and sampled capacitance value form a relative magnitude relationship meeting a certain preset condition. Specific explanations refer to subsequent descriptions.

Figure 3:
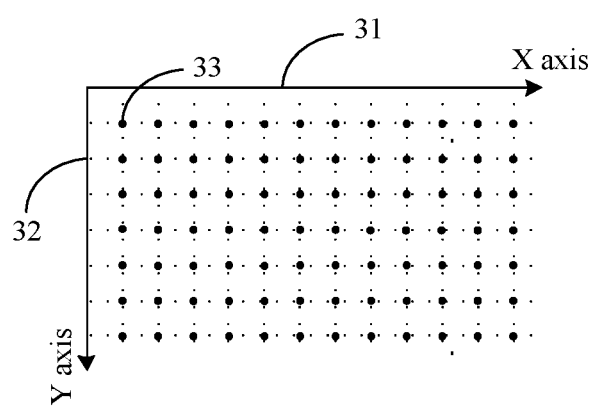
FIG. 3 is a distribution diagram of each matrix dot on a touch screen according to an embodiment of the disclosure.

FIG. 3 is a distribution diagram of each matrix dot on a touch screen 15 according to an embodiment of the disclosure. From FIG. 3, it can be seen that a logical transmitter 31 and a logical receiver 32 are arranged on mutually perpendicular adjacent side edges of the touch screen 15, the mutually perpendicular adjacent side edges are taken as an X axis and Y axis of a coordinate system, the logical transmitter is provided with multiple emission electrodes at equal intervals in the X axis, and the logical receiver is provided with multiple receiving electrodes at equal intervals in the Y axis. The emission electrodes and the receiving electrodes uniformly divide the touch screen 15 into multiple regions (for example, squares) in the same shape and size, and the matrix dots 33 are cross points formed by mutually crossing the emission electrodes arranged in the X axis and the receiving electrodes arranged in the Y axis, i.e., vertexes of the regions. Capacitance values corresponding to each matrix dot on the touch screen 15 may be obtained by scanning the emission electrodes and the receiving electrodes.

In the embodiment of the disclosure, when a finger or skin of the user touches a surface of the touch screen 15, the user and the surface of the touch screen 15 may form coupling capacitance under an effect of a human electric field, and the capacitance values of the touched matrix dots on the touch screen 15 are further changed. A sampling operation is performed on each matrix dot on the touch screen 15 in this state to obtain the capacitance values corresponding to each matrix dot on the touch screen 15 in this state as the sampled capacitance values of respective matrix dots.

Figure 4:
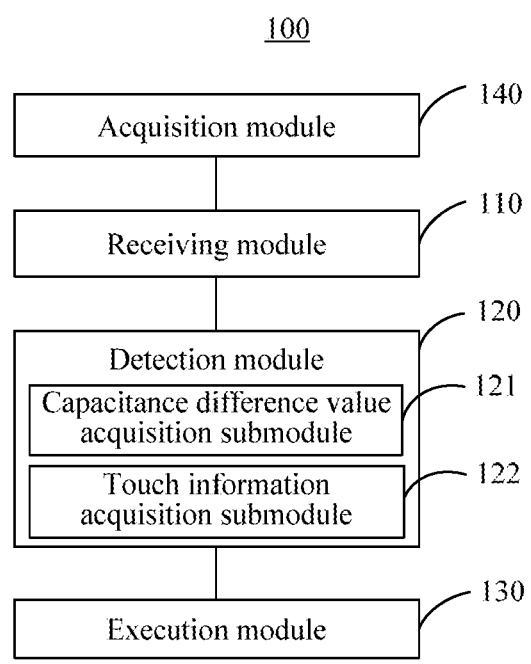
FIG. 4 is another block diagram of a touch control system shown in FIG. 1 according to an embodiment of the disclosure.

Referring to FIG. 4, in the embodiment of the disclosure, the detection module 120 may further include a capacitance difference value acquisition submodule 121 and a touch information acquisition submodule 122.

The capacitance difference value acquisition submodule 121 is configured to perform subtraction between the sampled capacitance values of respective matrix dots on the touch screen 15 and corresponding reference capacitance values of respective matrix dots to obtain capacitance difference values of respective matrix dots.

Figure 7:
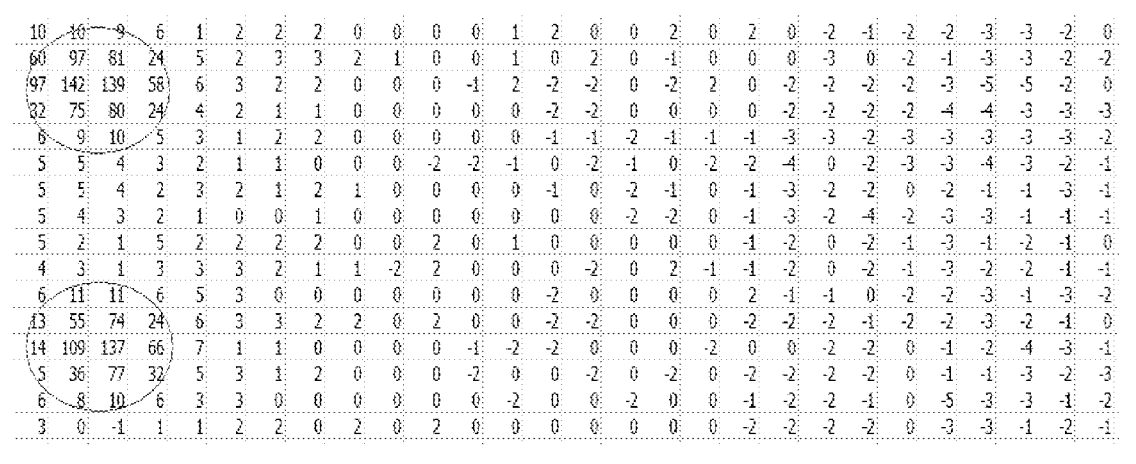

Referring to FIG. 5 and FIG. 6, in the embodiment of the disclosure, the capacitance difference value acquisition submodule 121 may perform subtraction between the sampled capacitance values and reference capacitance values corresponding to respective matrix dots on the touch screen 15 to obtain the capacitance difference values corresponding to respective matrix dots, specifically referring to FIG. 7.

In the embodiment of the disclosure, when an electric medium such as the skin or the finger gets close or touches the touch screen 15, the capacitance difference values corresponding to the touched matrix dots on the touch screen 15 may obviously change, so that a change condition of the capacitance difference value corresponding to each matrix dot on the touch screen 15 may reflect whether the matrix dot is touched or pressed or not.

The touch information acquisition submodule 122 is configured to compare the obtained capacitance difference values of respective matrix dots with a preset capacitance threshold value to obtain the effective touch information on the touch screen 15.

In the embodiment of the disclosure, the preset capacitance threshold value is a preset capacitance threshold value configured to obtain the effectively touched matrix dots on the touch screen 15. The preset capacitance threshold value may be set by the user or a manufacturer of the mobile terminal 10, and may be configured to reflect identification sensitivity of the mobile terminal 10 in a touch operation of the user.

In the embodiment of the disclosure, a manner in which the touch information acquisition submodule 122 compares the obtained capacitance difference values of respective matrix dots with the preset capacitance threshold value to obtain the effective touch information on the touch screen 15 includes the following operations. The matrix dots having respective capacitance difference values larger than the preset capacitance threshold value are screened.

The effective touch information on the touch screen 15 is obtained from the matrix dots having respective capacitance difference values larger than the preset capacitance threshold value.

In the embodiment of the disclosure, the effective touch information may be, but not limited to, the number of the matrix dots effectively touched by the user on the touch screen 15, or a total area on the touch screen 15 and occupied by regions where the effectively touched matrix dots are located.

Figure 8:
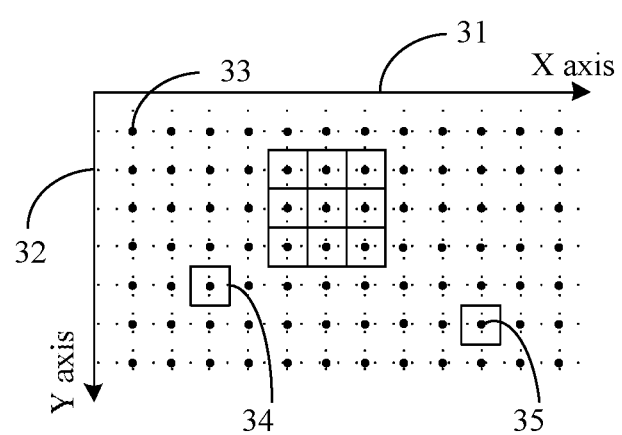
FIG. 8 is a schematic diagram of effective touch information on a touch screen according to an embodiment of the disclosure.

FIG. 8 is a schematic diagram of effective touch information on a touch screen 15 according to an embodiment of the disclosure. The number of the effectively touched matrix dots is the number of the matrix dots having respective capacitance difference values larger than the preset capacitance threshold value, and may reflect an effective touch range of the user on the touch screen 15.

Still referring to FIG. 8, the region 34 where the effectively touched matrix dot is located refers to a region centered about the effectively touched matrix dot 35 and in a shape and size the same as those of the region formed by mutually crossing the emission electrodes and the receiving electrodes.

The execution module 130 is configured to compare a value of the effective touch information with a preset touch information threshold value, when the value of the effective touch information is less than or equal to the preset touch information threshold value, respond with a preset operation to the touch control operation on the touch fingerprint sensor 16, and when the value of the effective touch information is larger than the preset touch information threshold value, terminate a response by the touch fingerprint sensor 16 to the touch control operation.

In the embodiment of the disclosure, the preset touch information threshold value and the effective touch information correspond to one another. When the effective touch information is the number of the matrix dots having respective capacitance difference values larger than the preset capacitance threshold value, the preset touch information threshold value is a preset touched matrix dot number threshold value. When the effective touch information is the total area on the touch screen 15 and occupied by the regions where respective matrix dots having respective capacitance difference values larger than the preset capacitance threshold value are located, the preset touch information threshold value is a preset area threshold value. In the embodiment of the disclosure, the preset touch information threshold value may be set by the user or the manufacturer of the mobile terminal 10, and may be configured to reflect a touch control class of the mobile terminal 10.

In the embodiment of the disclosure, the preset operation includes, but not limited to, controlling the touch fingerprint sensor 16 for fingerprint identification, unlocking the mobile terminal 10 through the touch fingerprint sensor 16, controlling the touch fingerprint sensor 16 for online payment (for example, Apple pay), logging with an account through the touch fingerprint sensor 16 and the like.

Optionally, in the embodiment of the disclosure, the preset operation is controlling the touch fingerprint sensor 16 for fingerprint identification.

In the embodiment of the disclosure, a manner in which the execution module 130 compares a value of the effective touch information with the preset touch information threshold value and executes the corresponding preset operation according to a comparison result includes the following operations.

When the value of the effective touch information is less than or equal to the preset touch information threshold value, the touch fingerprint sensor 16 is controlled for fingerprint identification. Fingerprint identification refers to acquiring fingerprint information of the user through the touch fingerprint sensor 16 and identifying and matching the fingerprint information of the user and fingerprint information reserved in the fingerprint database 200 and preset by the user with an operation right over the mobile terminal 10. When the fingerprint information of the user is successfully matched with the fingerprint information, reserved in the fingerprint database 200, with an access right over the mobile terminal 10, the user is allowed to access the mobile terminal 10.

When the value of the effective touch information is larger than the preset touch information threshold value, a response by the touch fingerprint sensor 16 to the touch control operation is terminated. It is possible to prevent the condition that the touch fingerprint sensor 16 is accidentally triggered by an accidental touch, which results in problems such as frequent vibration notification generated by the mobile terminal 10 or a screen locking caused by an excessive number of times of unlocking and further brings influence on battery life and user experience of the mobile terminal 10.

Still referring to FIG. 4, the touch control system 100 further includes an acquisition module 140.

In the embodiment of the disclosure, the acquisition module 140 is configured to perform a sampling operation on each matrix dot on the touch screen 15 when the touch screen is not touched to obtain the reference capacitance values of respective matrix dots.

In an implementation mode of the embodiment of the disclosure, the reference capacitance values may be obtained by performing a sampling operation on each matrix dot on the touch screen 15 when the mobile terminal 10 carrying the touch screen 15 is started, and the capacitance value, obtained in this state, corresponding to each matrix dot on the touch screen 15 is determined as the reference capacitance value of the matrix dot. In another implementation mode of the embodiment of the disclosure, the reference capacitance values may also be the capacitance values corresponding to each matrix dot when the touch fingerprint sensor 16 does not receive the touch control operation of the user or the touch fingerprint sensor 16 has received the touch control operation but the user does not touch the touch screen 15.

Figure 9:
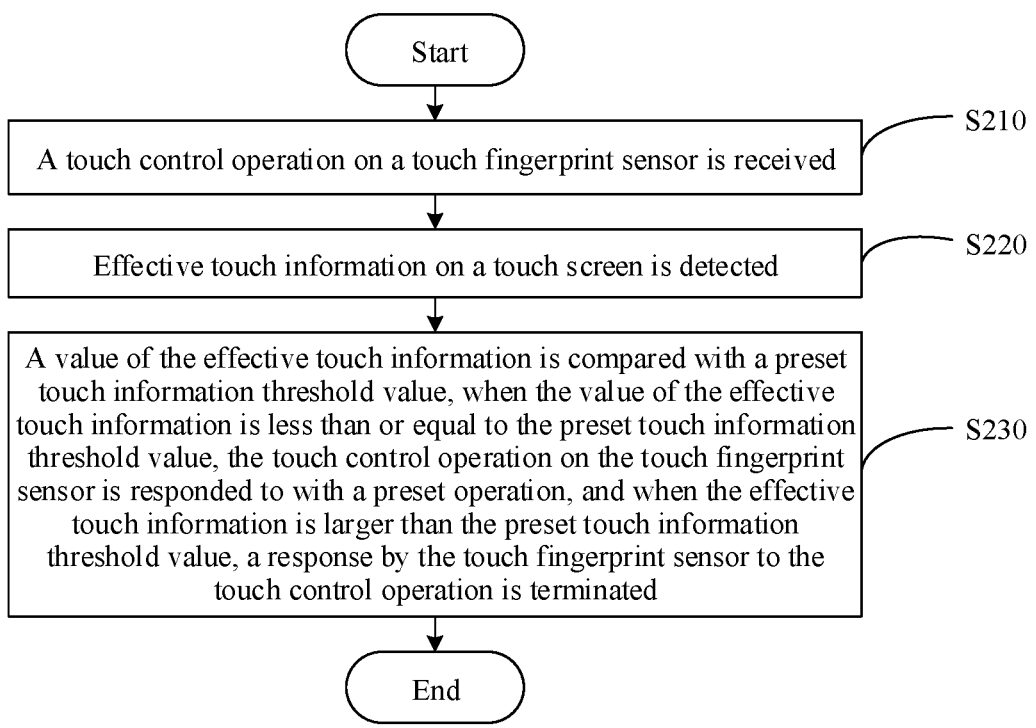
FIG. 9 is a specific flowchart of a touch control method according to an embodiment of the disclosure.

FIG. 9 is a specific flowchart of a touch control method according to an embodiment of the disclosure. A specific flow of the method will be described below. In the embodiment of the disclosure, the touch control method may include the following steps.

In S210, a touch control operation on a touch fingerprint sensor 16 is received. In the embodiment of the disclosure, a process described in S210 may be executed by the receiving module 110 shown in FIG. 2, and detailed descriptions about S210 may refer to the specific descriptions about the receiving module 110.

In S220, effective touch information on a touch screen 15 is detected.

Figure 10:
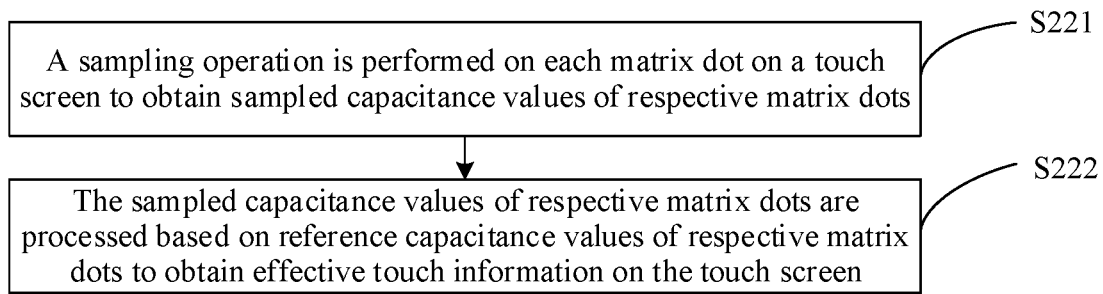
FIG. 10 is a flowchart of sub-steps in S220 in FIG. 9.

In the embodiment of the disclosure, a process described in S220 may be executed by the detection module 120 shown in FIG. 2, and detailed descriptions about S220 may refer to the specific descriptions about the detection module 120. FIG. 10 is a flowchart of sub-steps in S220 in FIG. 9. S220 may include the following sub-steps.

In S221, a sampling operation is performed on each matrix dot on the touch screen 15 to obtain sampled capacitance values of respective matrix dots.

In S222, the sampled capacitance values of respective matrix dots are processed based on reference capacitance values of respective matrix dots to obtain the effective touch information on the touch screen 15.

Figure 11:
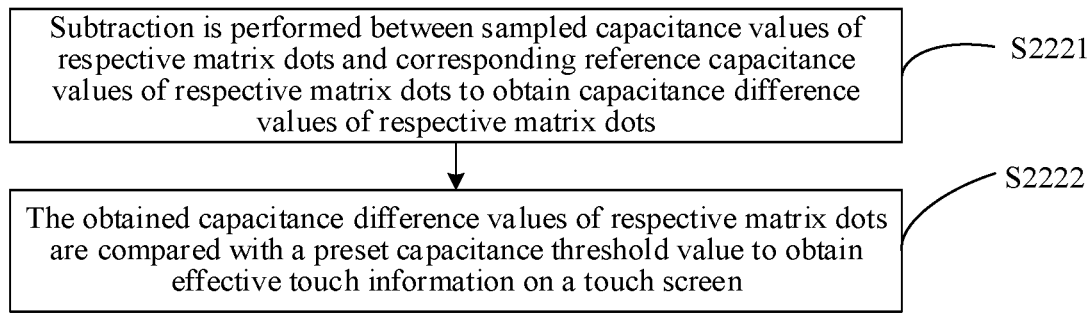
FIG. 11 is a flowchart of sub-steps in S222 in FIG. 10.

FIG. 11 is a flowchart of sub-steps in S222 in FIG. 10. In the embodiment of the disclosure, S222 may further include the following sub-steps.

In S2221, subtraction is performed between the sampled capacitance values of respective matrix dots and corresponding reference capacitance values of respective matrix dots to obtain capacitance difference values of respective matrix dots.

In S2222, the obtained capacitance difference values of respective matrix dots are compared with a preset capacitance threshold value to obtain the effective touch information on the touch screen 15.

In the embodiment of the disclosure, the effective touch information may be the number of the matrix dots having respective capacitance difference values larger than the preset capacitance threshold value, and may also be a total area on the touch screen 15 and occupied by regions where respective matrix dots having respective capacitance difference values larger than the preset capacitance threshold value are located.

The process described in S220 may be executed by the detection module 120 shown in FIG. 2, and detailed descriptions about S230 may refer to the specific descriptions about the detection module 120.

In S230, a value of the effective touch information is compared with a preset touch information threshold value, when the value of the effective touch information is less than or equal to the preset touch information threshold value, the touch control operation on the touch fingerprint sensor 16 is responded to with a preset operation, and when the value of the effective touch information is larger than the preset touch information threshold value, a response by the touch fingerprint sensor 16 to the touch control operation is terminated.

In the embodiment of the disclosure, the effective touch information and the preset touch information threshold value correspond to one another. When the effective touch information is the number of the matrix dots having respective capacitance difference values larger than the preset capacitance threshold value, the preset touch information threshold value is a preset touched matrix dot number threshold value. When the effective touch information is the total area on the touch screen 15 and occupied by the regions where respective matrix dots having respective capacitance difference values larger than the preset capacitance threshold value are located, the preset touch information threshold value is a preset area threshold value.

In the embodiment of the disclosure, the preset operation includes, but not limited to, controlling the touch fingerprint sensor 16 for fingerprint identification, unlocking the mobile terminal 10 through the touch fingerprint sensor 16, controlling the touch fingerprint sensor 16 for online payment (for example, Apple pay), logging with an account through the touch fingerprint sensor 16 and the like. Optionally, the preset operation is controlling the touch fingerprint sensor 16 for fingerprint identification.

When the effective touch information is smaller than the preset touch information threshold value, the touch fingerprint sensor 16 is controlled for fingerprint identification.

When the value of the effective touch information is larger than the preset touch information threshold value, the response by the touch fingerprint sensor 16 to the touch control operation is terminated. It is possible to prevent the condition that the touch fingerprint sensor 16 is accidentally triggered by an accidental touch, which results in problems such as frequent vibration notification by the mobile terminal 10 or a screen locking caused by an excessive number of times of unlocking and further brings influence on battery life and user experience of the mobile terminal 10.

A process described in S230 may be executed by the execution module 130 shown in FIG. 2, and detailed descriptions about S230 may refer to the specific descriptions about the execution module 130.

Figure 12:
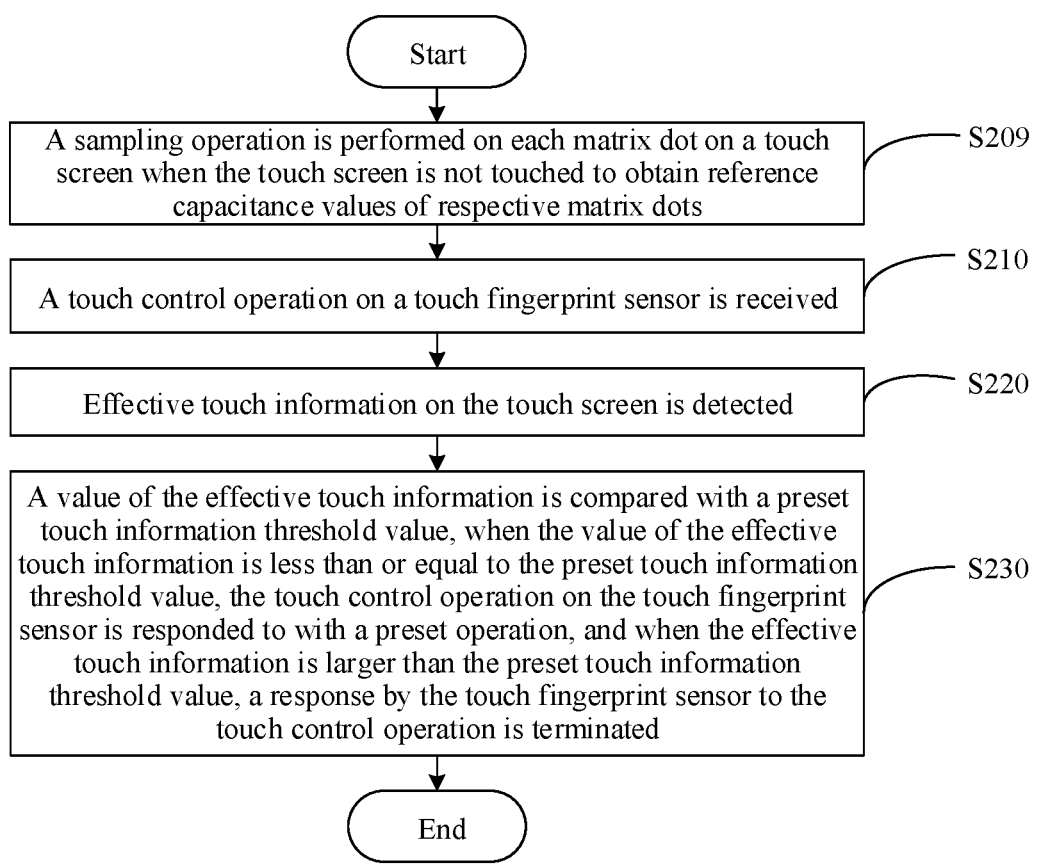
FIG. 12 is another specific flowchart of a touch control method according to an embodiment of the disclosure.

FIG. 12 is another flowchart of a touch control method according to an embodiment of the disclosure. The touch control method may further include the following steps.

In S209, the sampling operation is performed on each matrix dot on the touch screen 15 when the touch screen is not touched to obtain the reference capacitance values of respective matrix dots.

In the embodiment of the disclosure, a process described in S209 may be executed by the acquisition module 140 shown in FIG. 2, and detailed descriptions about S209 may refer to the specific descriptions about the acquisition module 140.

From the above, the embodiments of the disclosure provide the touch control method and system, the mobile terminal and a storage medium. According to the touch control method, the effective touch information on the touch screen is acquired, a value of the effective touch information is compared with the preset touch information threshold value, and a corresponding preset operation is further executed according to a comparison result, thereby overcoming in a great extent the problem in the related art that the touch fingerprint sensor is likely to be accidentally triggered, preventing frequent vibration notification caused by the accidental triggering problem or a screen locking caused by an excessive number of times of unlocking, and ensuring better battery life and user experience of the mobile terminal.

In the embodiments of the disclosure, it is to be understood that the disclosed system and method may also be implemented in another manner. The system and method embodiments described above are only schematic. For example, the flowcharts and block diagrams in the drawings illustrate probably implemented system architectures, functions and operations of the system, method and computer program product according to multiple embodiments of the disclosure. On this aspect, each block in the flowcharts or the block diagrams may represent part of a module, a program segment or a code, and part of the module, the program segment or the code includes one or more executable instructions configured to realize a specified logical function. It is also to be noted that, in some alternative implementation modes, the functions marked in the blocks may also be realized in a sequence different from those marked in the drawings. For example, two continuous blocks may actually be executed substantially concurrently and may also be executed in a reverse sequence sometimes, which is determined by the involved functions. It is further to be noted that each block in the block diagrams and/or the flowcharts and a combination of the blocks in the block diagrams and/or the flowcharts may be implemented by a dedicated hardware-based system configured to execute a specified function or operation or may be implemented by a combination of a special hardware and a computer instruction.

In addition, each function module in each embodiment of the disclosure may be integrated into an independent part, each module may also exist independently, and two or more than two modules may also be integrated into an independent part.

When being realized in form of software function module and sold or used as an independent product, the function may also be stored in a computer-readable storage medium. Based on such an understanding, the technical solutions of the disclosure substantially or parts making contributions to the related art or part of the technical solutions may be embodied in form of software product, and the computer software product is stored in a storage medium, including a plurality of instructions configured to enable a computer device (which may be a PC, an electronic device, a network device or the like) to execute all or part of the steps of the method in each embodiment of the disclosure. It is to be noted that terms "include" and "contain" in the disclosure or any other variant thereof is intended to cover nonexclusive inclusions, so that a process, method, object or device including a series of elements not only includes those elements but also includes other elements which are not clearly listed or further includes elements intrinsic to the process, the method, the object or the device. Under the condition of no more limitations, an element defined by the statement "including a/an" does not exclude existence of the same other elements in a process, method, object or device including the element.

The above is only the preferred embodiment of the disclosure and not intended to limit the disclosure. For those skilled in the art, the disclosure may have various modifications and variations. Any modifications, equivalent replacements, improvements and the like made within the spirit and principle of the disclosure shall fall within the scope of protection of the disclosure.

INDUSTRIAL APPLICABILITY

According to the embodiments of the disclosure, the touch control operation on the touch fingerprint sensor is received; the effective touch information on the touch screen is detected; and a value of the effective touch information is compared with the preset touch information threshold value, when the value of the effective touch information is less than or equal to the preset touch information threshold value, the touch control operation on the touch fingerprint sensor is responded to with a preset operation, and when the value of the effective touch information is larger than the preset touch information threshold value, the response by the touch fingerprint sensor to the touch control operation is terminated. The problem in the related art that the touch fingerprint sensor is likely to be accidentally triggered is overcome, frequent vibration notification caused by the accidental triggering problem or a screen locking caused by an excessive number of times of unlocking is prevented, and better battery life and user experience of the mobile terminal are ensured.

The invention claimed is:

1. A touch control method, comprising:
receiving a touch control operation on a touch fingerprint sensor in a mobile terminal;
detecting effective touch information on a touch screen of the mobile terminal;
comparing a value of the effective touch information with a preset touch information threshold value;
when the value of the effective touch information is less than or equal to the preset touch information threshold value, responding with a preset operation to the touch control operation on the touch fingerprint sensor; and
when the value of the effective touch information is larger than the preset touch information threshold value, terminating a response by the touch fingerprint sensor to the touch control operation,
wherein the detecting the effective touch information on the touch screen comprises:
performing a sampling operation on each matrix dot on the touch screen to obtain sampled capacitance values of respective matrix dots; and
processing the sampled capacitance values of respective matrix dots based on reference capacitance values of respective matrix dots to obtain the effective touch information on the touch screen,
wherein the processing the sampled capacitance values of respective matrix dots based on the reference capacitance values of respective matrix dots to obtain the effective touch information on the touch screen comprises:
performing subtraction between the sampled capacitance values of respective matrix dots and corresponding reference capacitance values of respective matrix dots to obtain capacitance difference values of respective matrix dots; and
comparing the obtained capacitance difference values of respective matrix dots with a preset capacitance threshold value to obtain the effective touch information on the touch screen,
wherein the comparing the obtained capacitance difference values of respective matrix dots with the preset capacitance threshold value to obtain the effective touch information on the touch screen comprises:
screening matrix dots having respective capacitance difference values larger than the preset capacitance threshold value; and
obtaining the effective touch information on the touch screen from the matrix dots having the respective capacitance difference values larger than the preset capacitance threshold value.

2. The touch control method of claim 1, prior to the processing the sampled capacitance values of respective matrix dots based on the reference capacitance values of respective matrix dots to obtain the effective touch information on the touch screen, the method further comprising:
performing the sampling operation on each matrix dot on the touch screen when the touch screen is not touched to obtain the reference capacitance values of respective matrix dots.

3. The touch control method according to claim 1, wherein
the effective touch information is a number of the matrix dots having respective capacitance difference values larger than the preset capacitance threshold value; or
the effective touch information is a total area on the touch screen and occupied by regions where the matrix dots having respective capacitance difference values larger than the preset capacitance threshold value are located.

4. A touch control system, comprising:
a touch screen;
a touch fingerprint sensor;
memory, configured to store an executable instruction; and
a processor, configured to execute the executable instruction stored in the memory to implement steps of:
receiving a touch control operation on a touch fingerprint sensor of a mobile terminal;
detecting effective touch information on a touch screen of the mobile terminal;
comparing a value of the effective touch information with a preset touch information threshold value;
when the value of the effective touch information is less than or equal to the preset touch information threshold value, responding with a preset operation to the touch control operation on the touch fingerprint sensor; and
when the value of the effective touch information is larger than the preset touch information threshold value, terminating a response by the touch fingerprint sensor to the touch control operation, wherein the detecting the effective touch information on the touch screen comprises:

performing a sampling operation on each matrix dot on the touch screen to obtain sampled capacitance values of respective matrix dots; and processing the sampled capacitance values of respective matrix dots based on reference capacitance values of respective matrix dots to obtain the effective touch information on the touch screen, wherein the processing the sampled capacitance values of respective matrix dots based on the reference capacitance values of respective matrix dots to obtain the effective touch information on the touch screen comprises:

performing subtraction between the sampled capacitance values of respective matrix dots and corresponding reference capacitance values of respective matrix dots to obtain capacitance difference values of respective matrix dots; and comparing the obtained capacitance difference values of respective matrix dots with a preset capacitance threshold value to obtain the effective touch information on the touch screen, wherein the comparing the obtained capacitance difference values of respective matrix dots with the preset capacitance threshold value to obtain the effective touch information on the touch screen comprises:

screening matrix dots having respective capacitance difference values larger than the preset capacitance threshold value; and obtaining the effective touch information on the touch screen from the matrix dots having the respective capacitance difference values larger than the preset capacitance threshold value.

5. The touch control system of claim 4, wherein prior to the processing the sampled capacitance values of respective matrix dots based on the reference capacitance values of respective matrix dots to obtain the effective touch information on the touch screen, the processor is configured to execute the executable instruction stored in the memory to further implement a step of:

performing the sampling operation on each matrix dot on the touch screen when the touch screen is not touched to obtain the reference capacitance values of respective matrix dots.

6. The touch control system according to claim 4, wherein the effective touch information is a number of the matrix dots having respective capacitance difference values larger than the preset capacitance threshold value; or the effective touch information is a total area on the touch screen and occupied by regions where the matrix dots having respective capacitance difference values larger than the preset capacitance threshold value are located.

7. A non-transitory storage medium having stored thereon executable instructions that, when executed by a processor, cause the processor to implement a touch control method, the method comprising:

receiving a touch control operation on a touch fingerprint sensor in a mobile terminal;

detecting effective touch information on a touch screen of the mobile terminal;

comparing a value of the effective touch information with a preset touch information threshold value;

when the value of the effective touch information is less than or equal to the preset touch information threshold value, responding with a preset operation to the touch control operation on the touch fingerprint sensor; and when the value of the effective touch information is larger than the preset touch information threshold value, terminating a response by the touch fingerprint sensor to the touch control operation, wherein the detecting the effective touch information on the touch screen comprises:

performing a sampling operation on each matrix dot on the touch screen to obtain sampled capacitance values of respective matrix dots; and processing the sampled capacitance values of respective matrix dots based on reference capacitance values of respective matrix dots to obtain the effective touch information on the touch screen, wherein the processing the sampled capacitance values of respective matrix dots based on the reference capacitance values of respective matrix dots to obtain the effective touch information on the touch screen comprises:

performing subtraction between the sampled capacitance values of respective matrix dots and corresponding reference capacitance values of respective matrix dots to obtain capacitance difference values of respective matrix dots; and comparing the obtained capacitance difference values of respective matrix dots with a preset capacitance threshold value to obtain the effective touch information on the touch screen, wherein the comparing the obtained capacitance difference values of respective matrix dots with the preset capacitance threshold value to obtain the effective touch information on the touch screen comprises:

screening matrix dots having respective capacitance difference values larger than the preset capacitance threshold value; and obtaining the effective touch information on the touch screen from the matrix dots having the respective capacitance difference values larger than the preset capacitance threshold value.

8. The non-transitory storage medium of claim 7, wherein prior to the processing the sampled capacitance values of respective matrix dots based on the reference capacitance values of respective matrix dots to obtain the effective touch information on the touch screen, the method further comprises:

performing the sampling operation on each matrix dot on the touch screen when the touch screen is not touched to obtain the reference capacitance values of respective matrix dots.

9. The non-transitory storage medium according to claim 7, wherein the effective touch information is a number of the matrix dots having respective capacitance difference values larger than the preset capacitance threshold value; or the effective touch information is a total area on the touch screen and occupied by regions where the matrix dots having respective capacitance difference values larger than the preset capacitance threshold value are located.

* * * * *